US011544206B2

United States Patent
Götz et al.

(10) Patent No.: US 11,544,206 B2
(45) Date of Patent: Jan. 3, 2023

(54) PROCESS CONTROL UNIT AND METHOD FOR INTERPROCESS EXCHANGE OF PROCESS VARIABLES

(71) Applicant: Siemens Aktiengesellschaft, Munich (DE)

(72) Inventors: Jan Götz, Buckenhof (DE); Alexander Pelzer, Fürth (DE); Jürgen Reichmann, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 32 days.

(21) Appl. No.: 17/266,723

(22) PCT Filed: Jul. 4, 2019

(86) PCT No.: PCT/EP2019/068016
§ 371 (c)(1),
(2) Date: Feb. 8, 2021

(87) PCT Pub. No.: WO2020/035214
PCT Pub. Date: Feb. 20, 2020

(65) Prior Publication Data
US 2021/0302930 A1    Sep. 30, 2021

(30) Foreign Application Priority Data
Aug. 13, 2018   (EP) .................... 18188724

(51) Int. Cl.
G05B 19/042    (2006.01)
G06F 13/16    (2006.01)
G06F 16/22    (2019.01)

(52) U.S. Cl.
CPC ..... G06F 13/1668 (2013.01); G05B 19/0423 (2013.01); G05B 19/0426 (2013.01);
(Continued)

(58) Field of Classification Search
CPC ...... G05B 19/0426; G05B 2219/23043; G05B 2219/33149; G05B 19/054;
(Continued)

(56) References Cited

U.S. PATENT DOCUMENTS 7,664,985 B2 * 2/2010 Ertel ............... G06F 11/366
714/39
2003/0061295 A1 * 3/2003 Oberg .................. H04L 67/52
709/227
(Continued)

FOREIGN PATENT DOCUMENTS

CN     103809512 A  *  5/2014  ........... G05B 19/404
EP     3208974 A1      8/2017

OTHER PUBLICATIONS

Beckhoff "Manual TC3 IoT Communication (MQTT)", pp. 1-128, XP055629989. Version 1.5 dated Dec. 13, 2018. http://filfar.by/PDF/beckhoff/TF6701_TC3_IoT_Communication_MQTT_EN.pdf.
(Continued)

*Primary Examiner* — Ramesh B Patel
(74) *Attorney, Agent, or Firm* — Lempia Summerfield Katz LLC

(57) ABSTRACT

The process control unit is configured to execute a plurality of control processes, wherein a first control process executed on the process control unit is configured such that there is no provision for direct exchange of process variables with a second control process, but rather this exchange takes place via an interposed association module. An association specification is used to ascertain the control process(es) to which the process variable needs to be handed over. One advantage includes the increased flexibility in the exchange of process variables, which now takes place in the individual control processes by an association module. Restarts of the process control unit and associated production losses advantageously become unnecessary. Additional resources in the
(Continued)

process control unit or in an engineering system may be reduced or avoided. The decreased complexity means that the control systems and engineering systems are developed more easily and hence also more quickly.

15 Claims, 3 Drawing Sheets

(52) U.S. Cl.
CPC .... *G06F 16/22* (2019.01); *G05B 2219/23043* (2013.01); *G05B 2219/34196* (2013.01)

(58) Field of Classification Search
CPC ........ G05B 2219/34263; G05B 19/042; G05B 19/0423; G05B 2219/34196; H04L 67/10; H04L 67/12; G06F 13/1668; G06F 16/22
See application file for complete search history.

(56) References Cited

U.S. PATENT DOCUMENTS

| | | | |
|---|---|---|---|
| 2011/0081898 A1* | 4/2011 | Park | H04W 24/00 455/418 |
| 2015/0316922 A1* | 11/2015 | Rischar | G05B 19/41855 700/23 |
| 2016/0162516 A1* | 6/2016 | Pelzer | G06F 16/211 707/803 |
| 2017/0097617 A1* | 4/2017 | Tegnell | H04L 67/10 |
| 2018/0188715 A1* | 7/2018 | Celia | G05B 11/32 |

OTHER PUBLICATIONS

PCT International Search Report and Written Opinion of International Searching Authority dated Oct. 17, 2019 corresponding to PCT International Application No. PCT/EP2019/068016 filed Jul. 4, 2019.

* cited by examiner

PROCESS CONTROL UNIT AND METHOD FOR INTERPROCESS EXCHANGE OF PROCESS VARIABLES

The present patent document is a § 371 nationalization of PCT Application Serial No. PCT/EP2019/068016, filed Jul. 4, 2019, designating the United States, which is hereby incorporated by reference, and this patent document also claims the benefit of European Patent Application No. 18188724.1, filed Aug. 13, 2018, which is also hereby incorporated by reference.

TECHNICAL FIELD

The disclosure relates to a process control unit that is used in particular for control or feedback control of a machine or installation. The disclosure additionally relates to a method for interprocess interchange of process variables.

BACKGROUND

Field devices in process and production automation engineering are understood to be devices of all kinds that, when used at process level, capture or process process-relevant information. Process variables are captured using measuring devices or sensors, (e.g., for pressure measurement, temperature measurement, conductivity measurement, flow measurement, pH measurement, and fill level measurement). Process variables are influenced using actuators, (e.g., pumps or valves). Besides the aforementioned sensors and actuators, field devices are also understood to mean devices of all kinds that are arranged on a field plane.

The measured values captured by sensors are normally conveyed via a field bus to one or more process control units, which process the measured values further if need be. A data transmission is also effected in the reverse direction from process control units to field devices, in particular for the purpose of controlling actuators and for the purpose of configuring and parameterizing the field devices.

Even though the computing core, (e.g., a microprocessor or microcontroller having an associated volatile main memory for executing a control program and multiple I/O interfaces), of modern process control units appears to be only slightly distinguishable from that of widely implemented small computer architectures, the sensitivity of the control task and of its possible effects on an industrial process calls for a few special features. These are grounded primarily in robust coupling between the physical outside world, that is to say the system to be controlled, and the hardware and software of the process control unit. A process control unit is responsible for a specific previously configurable area of an automation task and keeps the data and software required therefor locally.

Extensions in this automation task, (e.g., an extension of the process control unit by additional inputs or outputs or else a software update for the control program), currently require a complete change of control program running on the process control unit, the change entailing stopping the system, recompiling the control program, and restarting the system. Updating or changing the control program thus results in a temporary loss of production in the system that is to be controlled by the process control unit. Such a loss of production may need to be avoided in process and production automation engineering.

The need for modular organization of the software on a process control unit, that is to say reorganization of the currently largely monolithic control program in the direction of a plurality of modularly cooperating control processes, has therefore already been identified in the prior art. In the case of process control units known to date, changing, swapping, or updating modular control processes in the course of operation encounters the problem that an interprocess data interchange between the control processes is currently defined in the respective control process. Additional or changed control processes are therefore unable to be introduced dynamically, because a changed interprocess data interchange between a changed control process and an existing control process does not work for all process variables, (e.g., if more or different process variables are intended to be communicated for a changed control process than for the original control process). There is additionally currently no way of dynamically diverting an interprocess data interchange of an existing, ongoing control process while the communication partner thereof (e.g., a control process to be changed) is subject to an update.

SUMMARY AND DESCRIPTION

Against this background, it is the object of the present disclosure to provide a process control unit that provides more flexible interprocess interchange of process variables for a plurality of control processes.

The scope of the present disclosure is defined solely by the appended claims and is not affected to any degree by the statements within this summary. The present embodiments may obviate one or more of the drawbacks or limitations in the related art The object is achieved by a process control unit configured to execute a plurality of control processes, wherein at least one control process undertakes the actual control task, that is to say control of an industrial process. Further control processes support this control task or provide additional functionalities.

At least one first control process performed on the process control unit is configured such that, for the performance thereof, there is no provision for an interchange of process variables with a second control process directly, but rather this interchange is effected via an interposed association module.

The process variable includes a process variable identification, (e.g., an address, a process variable name, etc.), and a process variable value, in particular the numerical value of a measured quantity in a stipulated, otherwise arbitrary, data format or else a binary value or flag that indicates the occurrence or non-occurrence of a condition.

An association module is configured to interchange the process variables, the association module receiving a process variable transferred from the first control process, the process variable identification of which process variable is read and transferred to an association rule. The association rule is used to ascertain the control process or control processes to which the process variable is to be transferred. The at least one process variable is subsequently transferred to the control processes based on the control processes ascertained from the association rule.

A particular advantage may be seen in the increased flexibility in the interchange of process variables, which is now effected in the individual control processes by an association module as a departure from "logical wiring" frozen by programming. In this regard, the control processes are configured such that process variables may be transferred to the association module, from where the process variables are relayed further on the basis of an association rule. This measure permits a receiver of the process variables to be replaced by another receiver by changing the association rule. Alternatively, a further receiver may also be added for a process variable by an appropriate change of the association rule. Such a measure would have been possible previously only by a more complex change and recompilation of the control process sending the process variable.

The object is additionally achieved by a method for interprocess interchange of process variables within a process control unit and by a computer program for performing the method. The computer program is performed as a control process in at least one processor of a process control unit, which processor carries out the method with the performance.

According to one advantageous variant, there is provision that, for one or more process variables transferred to one or more control processes, the process variable identification read in the association module is replaced, prior to the transfer, by a process variable identification stipulated by the association rule. Such replacement of the process variable identification is useful, for example, if a process variable identification was replaced by another in a receiver control process or if the process variable is deliberately intended to be diverted to a process variable receiver.

According to one advantageous variant, there is provision for the transfer of the process variables to a control process to be effected in cycle-oriented fashion. Process control units may operate in cycle-oriented fashion, with at least one control process or else an operating system of the process control unit controlling the cycle. A control process updates the input process image applied to the inputs of the process control unit by sensors of a production installation and transfers the input process image to at least one other control process. After performing control instructions, the control process then transfers an output process image, which is then forwarded by this or another control process or the operating system via the outputs to the actuators of the production installation. The control cycle then starts from the beginning. The cycle time may be firmly stipulated or else of asynchronous design. Furthermore, control processes may include multiple tasks to be executed cyclically that each have different cycle times. Each task is then provided with an applicable input process image, which is translated into an output process image by instructions of the task. The individual process images may be of different size, that is to say may have different data volumes. Fast tasks of the control program may require only few process data, whereas slower tasks may process large volumes of process data.

According to an alternative advantageous variant, there is provision for the transfer of at least one process variable to at least one second control process to be effected within a stipulable period. According to this embodiment, reception of the process variable on the association module results in, for example, a timer being started that determines a period before the value is transferred to the receiver of the process variable. Alternatively, the process variable is assigned a timestamp on the association module, which timestamp determines a time of the transfer of the value to the receiver of the process variable. The time or the period may be defined in units of time, in cycles of a timer, or in steps of a counter.

According to an alternative variant, there is provision for the association module to have an interface to a configuration process taking place outside the process control unit. This advantageous measure provides that a configuration process may access the association module for the purpose of changing the association rule without the program code on which the association module is based all needing to be changed or even recompiled.

According to one advantageous variant, there is provision for at least one control process to be configured to perform an iterative sequence of control instructions for controlling the industrial process taking place outside the process control unit. This at least one control process performs the actual control task of the process control unit with the connected field devices.

According to one advantageous variant, there is provision for the association module to be a control process that provides for storage of the process variables in a definable memory area of a volatile or nonvolatile memory.

According to one advantageous variant, there is provision for the association module to include a data bus having an associated bus database. The data bus may be configured to transfer at least one process variable value according to a process variable identification associated in the bus database.

BRIEF DESCRIPTION OF THE DRAWINGS

Further exemplary embodiments and advantages of the disclosure are explained in more detail below with reference to the drawing, in which.

DETAILED DESCRIPTION

Figure 1:
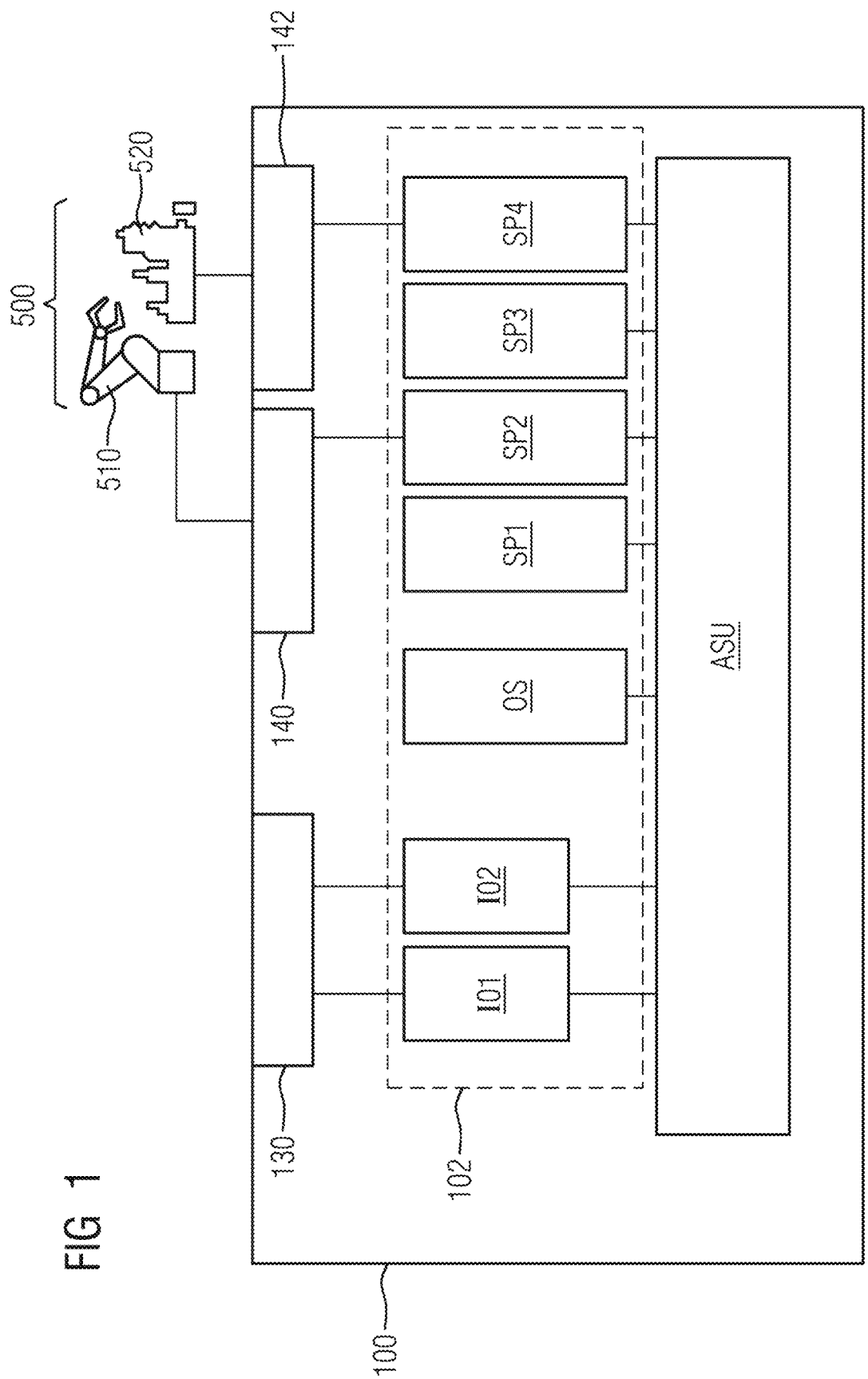
FIG. 1 depicts a block diagram of an embodiment of a process control unit.

FIG. 1 depicts an embodiment of a process control unit 100 for controlling an installation 500 that includes a robot 510 and a production machine 520, for example. The process control unit 100 is present in the form of a programmable logic controller or PLC, for example.

The process control unit 100 includes a memory area 102, depicted in dashed lines, in which a plurality of control processes SP1, SP2, SP3, SP4 performed concurrently by a microprocessor or microcontroller (not depicted) are loaded.

One or more modularly cooperating control processes SP1, SP2, SP3, SP4 are used for implementing specific functions, (e.g., logic control, flow control, temporal, counting, and arithmetic functions), in order to control different types of machines and processes by digital or analog input and output signals. To this end, the process control unit 100 has interfaces 140, 142 for controlling an installation or a machine or for connecting field devices in general. The interfaces 140, 142 are adapted for the manner of communication of the connected installations, machines, or field devices, in this case the robot 510 and the production machine 520.

In the example of FIG. 1, the first interface 140 is in the form of a field bus interface 140 to control the robot 510 and the second interface 142 is in the form of a digital input/output interface 142 to control the production machine 520. The field bus interfaces 140 mentioned first support in particular industrial communication standards such as Profibus, Foundation Fieldbus, HART, Wireless HART, etc. Ultimately the interfaces 140, 142 are controlled based on the cooperating control processes SP1, SP2, SP3, SP4 such that the installation, the machine, or the process operates in an envisaged manner.

The process control unit 100 additionally has at least one interface 130 for packet-oriented communication with arbitrary communication partners (not depicted), for example, field devices, superordinate servers such as a control console for superordinate control of an industrial process, or else engineering systems for transmitting updated program data from an engineering system to the process control unit 100.

Besides field buses, wired or wireless Ethernet network connections are increasingly also being used for industrial communication, the various advantages of which mean that it ought to reach the level of field device communication in future. Such field devices communicating on a packet-oriented basis are connected to the process control unit 100 via the interface 130 for packet-oriented communication. In an industrial setting, the packet-oriented communication is frequently IP (Internet Protocol) based, that is to say designed according to or in the style of an Ethernet standard from the protocol family IEEE 802. The industrial demands on deterministic data interchange with field devices in a sub-millisecond range, (e.g., also referred to as real time capability), today continue to require process control units 100 as a directly superordinate level to field devices and render the latter unnecessary in future also.

By today's standards, a future Ethernet-based field device communication ought to include the use of a manufacturer- and platform-independent industrial standard OPC UA (Open Platforms Communication Unified Architecture) and an extension of the IEEE 802.1 Ethernet standard by a real time capability, which is currently the subject of standardization activities as TSN (Time Sensitive Networks). Besides deterministic data transmissions in the sub-millisecond range, TSN also addresses demands in regard to simple configurability and cross-manufacturer interoperability.

Besides the control processes SP1, SP2, SP3, SP4, further input/output processes IO1, IO2 controlling the interface 130 for packet-oriented communication are executed in the memory area 102. These input/output processes IO1, IO2 may themselves be embodied as control processes analogously to the control processes SP1, SP2, SP3, SP4. Alternatively, these input/output processes IO1, IO2 may also take a separate stance from the control processes SP1, SP2, SP3, SP4, for example, because the latter are part of an operating system (not depicted) of the process control unit 100. The input/output processes IO1, IO2 include, e.g., a web server application or an OPC UA application.

For example, two control processes SP2, SP4 from the plurality of control processes SP1, SP2, SP3, SP4 in the process control unit 100 are configured to control an industrial process on the installation 500, while other control processes SP1, SP3 support this control or provide additional functionalities.

The modular nature of the control processes SP1, SP2, SP3, SP4 means that an interprocess data interchange between the control processes SP1, SP2, SP3, SP4 is required. This data interchange is discussed generally below as an interchange of process variables. These process variables include all of the data interchanged on an interprocess basis such as binary values, for example, flags indicating the occurrence or non-occurrence of a condition, addresses of memory cells to be read or written to or the values thereof, additionally also numerical values, character strings, etc. The content of these process variables is in particular not limited to content for supporting the actual industrial control task of the process control unit 100.

In the prior art, an interprocess data interchange between modular control processes is currently defined in the respective control process itself, for example, using a shared memory cell in a register or cache to which both control processes have read or write access. In this regard there is currently provision for the logic to be created in the program code of the respective control process itself. Programming-related logic of this kind in current practice is provided for example by an address or a pointer to an address of a shared memory cell.

Figure 2:
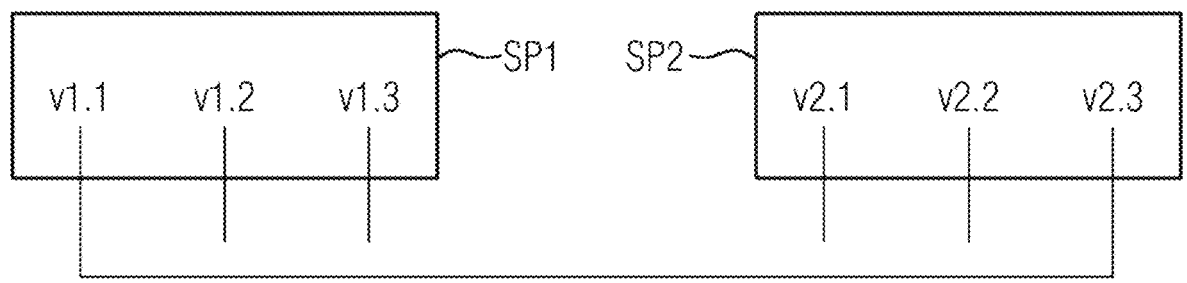
FIG. 2 depicts a block diagram of a logic combination for the interchange of at least one process variable between two control processes according to the prior art.

FIG. 2 depicts the interchange of a process variable between two control processes SP1, SP2 according to the prior art in more detail. In this case, the first control process SP1 has a portion containing three process variables v1.1, v1.2, v1.3. The second control process SP2 has—likewise a portion containing—three process variables v2.1, v2.2, v2.3.

The process variable v1.1 of the first control process SP1 is logically connected to the process variable v2.3 of the second control process SP2. This logical connection, depicted in the drawing by a line connecting the process variables, is intended to be understood to mean that read or write access to the process variable v2.3 of the second control process SP2 is realized in the program code of the first control process SP1. Conversely, read or write access to the process variable v1.1 of the first control process SP1 is realized in the program code of the second control process SP2. In this case the referencing of the particular other process-external variable may be effected in the program itself—or alternatively resolved or reassessed by the operating system—by referencing an address or a pointer to an address of a shared memory cell. In any case the referencing of the process-external variable is implemented in the program code of the respective control program itself.

An interprocess data interchange between modular control processes that is defined in the respective control process itself has several disadvantages.

For example, one disadvantage is that additional or changed (e.g., in the course of an update) control processes cannot be introduced dynamically, because an interprocess data interchange between a changed control process and an existing control process does not work for all process variables, for example, if more or different process variables are intended to be communicated for a changed control process than for the original control process.

An additional disadvantage is that there is currently no way of dynamically diverting an interprocess data interchange of an existing, ongoing control process while the communication partner thereof—a control process to be changed—is subject to an update.

If, in the course of operation, a change of configuration is required that involves the process variable v1.1 no longer being intended to be logically combined with the process variable v2.2 of the second control process SP2, but rather being intended to be logically combined with the process variable v2.3, for example, the present programming-related logic means that the following action is inevitable: operation of the process control unit 100 is stopped; the source code of the first control process SP1 is revised in terms of the described logic combination for the process variable v1.1 and the process-external process variable v2.3; the source code of the revised first control process SP1 is compiled and the compiled program code is loaded in the process control unit 100; and the process control unit 100 is restarted.

Such process control units are thus marked by a lack of flexibility on account of their monolithic design and their robust coupling of hardware and software. Scalability with regard to the functionality of process control units may currently be provided only by adding further process control units. Changes in the physical or data-related world frequently require reconfiguration, recompilation, and normally also restarting of the process control units involved. In that case, the recompiled components need to be stored on the process control unit in addition to the running components, which means an increased memory requirement.

The disclosure solves these currently existing problems by departing from an interprocess data interchange between modular control processes that is defined in the respective control process itself. There is provision for the data interchange of process variables to be provided not directly between control processes but rather via an interposed association module.

The process variable includes a process variable identification, (e.g., an address, a process variable name, etc.), and a process variable value, e.g., the numerical value of a measured quantity in a stipulated, otherwise arbitrary, data format, or else a binary value or flag that indicates the occurrence or non-occurrence of a condition.

Referring again to FIG. 1, an association module ASU is configured to interchange process variables, the association module receiving a process variable transferred from a first control process SP1 and subsequently ascertaining an association of the process variable, e.g., to which control process or to which control processes the process variable is to be transferred.

In a first, simple embodiment, this association module ASU is embodied as a common data bus between multiple control processes. The association is now made dynamically, e.g., at the runtime of the process control unit. A dynamic association of this kind is made based on an association rule, which in this embodiment may be stored in a logic table associated with the data bus. The logic table may be implemented as a data structure or database manageable by software.

According to this variant, a change of association may be made by the association module ASU—in this case embodied as a data bus with a logic table associated with the data bus—in the course of operation of the process control unit 100 without this requiring the process control unit 100 to stop operating, a change in the source code of the control processes, recompiling and loading of the control processes, or restarting of the process control unit 100.

In an advantageous manner, the association table (not depicted) of the association module ASU may be produced and managed easily, because the association table merely logically combines the respective process variables of the control processes involved. The process variable identifications used in the control processes, (e.g., variable names, data types, and other information of the individual software components), may be collected and used for the logic combination, e.g., by a configuration process such as an engineering system, taking place outside the process control unit. This allows the engineering to check the consistency of the connection. An association may be made either in text form (that is to say in the form of association rules with a structured formulation) or graphically (that is to say in the form of a machine-readable interconnection plan).

Figure 3:
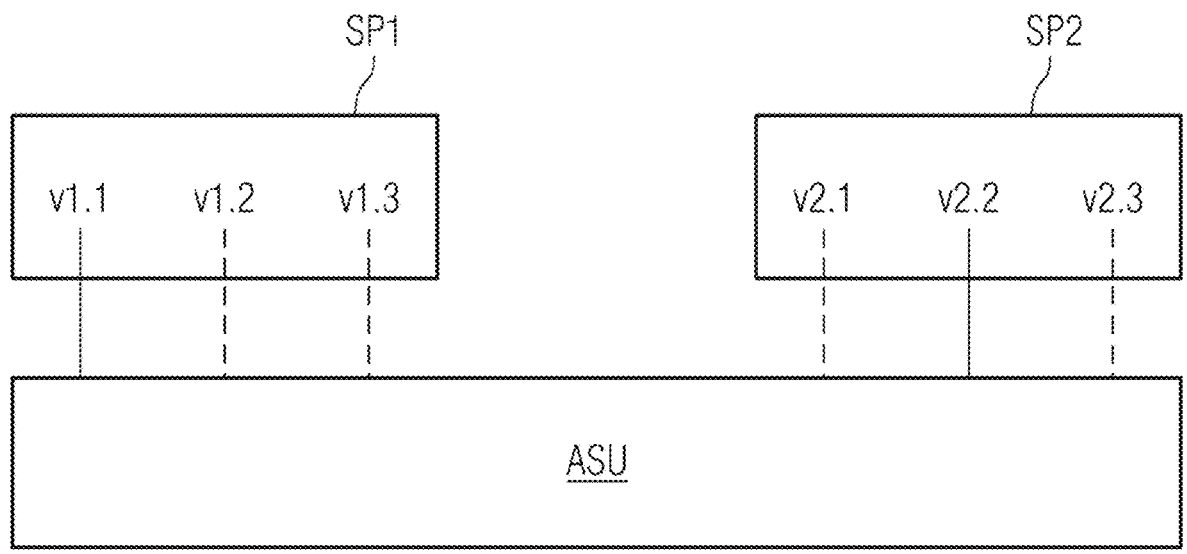
FIG. 3 depicts a block diagram of a logic combination for the interchange of at least one process variable between two control processes according to an exemplary embodiment.

On startup of the process control unit 100, the configuration of the logically combined process variables may be stored in the association table, e.g., the association, shown in FIG. 3, of a process variable that includes the process variable identification v1.1 in the first control process SP1 and the process variable identification v2.2 in the second control process SP2. The data structure of the association table in which the association of the process variable identifications v1.1 and v2.2 was described on startup of the process control unit may be adapted at any time in the course of operation, e.g., dynamically. This is illustrated in FIG. 3 by dashed lines that connect the data bus of the association module ASU to further process variable identifications v1.2, v1.3, v2.1, v2.3, alternatively or additionally.

In the course of operation, the first control process SP1 is configured such that there is provision for an interchange of the process variable, (which has the associated process variable identification v1.1 in the first control process SP1), with the second control process SP2 via the association module ASU such that the process variable transferred from the first control process SP1 is received by the association module ASU. The process variable identification v1.1 of the process variable is then read in the association module ASU. The process variable is then transferred to the association rule in the association module ASU. According to this association rule, the process variable identification v1.1 read in the association module is replaced by the process variable identification v2.3 stipulated by the association rule. The association module ASU transfers the process variable with what is now the process variable identification v2.3 to the second control process SP2. The process variable value may remain unchanged.

In a second embodiment, this association module ASU is embodied as a control process. With regard to FIG. 1, this would result in the association module ASU now being depicted to be within the dashed region of the memory area 102, in which the plurality of control processes SP1, SP2, SP3, SP4 are loaded.

The process variables are stored in the association module ASU in a definable memory area, that is to say, for example, of a register managed by the association module ASU in a processor-level register memory.

The association according to this second embodiment is made as described above based on the first exemplary embodiment. In the course of operation, the first control process SP1 is configured such that there is provision for an interchange of the process variable (which has the associated process variable identification v1.1 in the first control process SP1) with the second control process SP2 via the association module ASU such that the process variable transferred from the first control process SP1 is first received by the association module ASU. The process variable identification v1.1 of the process variable is then read in the association module ASU. The process variable is then transferred to the association rule in the association module ASU. The association rule is embodied, for example, as an association table or as a database that is accessed by the control process of the association module ASU. According to this association rule, the process variable identification v1.1 read in the association module ASU is replaced by the process variable identification v2.3 stipulated by the association rule. The association module ASU transfers the process variable with what is now the process variable identification v2.3 to the second control process SP2. The process variable value may remain unchanged.

The aforementioned association rule involving the process variable identification v1.1 read in the association module being replaced by a process variable identification v2.3 stipulated by the association rule is an optional act if the process variable identifications v1.1, v2.3 are not identical. This measure may be dispensed with for identical process variable identifications, that is to say, for example, a process variable identification "Temperature Sensor 34" that is valid and readable systemwide.

A dynamic change of association rule is explained in more detail below. If a change of configuration is required, for example, the process variable having the process variable identification v1.1 is no longer intended to be logically combined with the process variable having the process variable identification v2.2 of the second control process SP2 but rather is intended to be logically combined with the process variable having the process variable identification v2.3, this programming-related logic known in the prior art is invariably associated with changing the control processes SP1, SP2 involved, including restarting the system.

Process control units known to date are able to make changes to the control processes SP1, SP2, SP3, SP4 in the running system only by virtue of high levels of complexity in the engineering and in the runtime system of the hardware. To achieve a change, it is necessary, for example, to reserve memory space for these possible changes in the memory area 102 of the process control unit 100, which memory space may be used to temporarily store the changes. The changes require the program to be compiled and only certain changes are possible in the course of operation.

Using the means with the involvement of the association unit ASU means that this kind of change to the control processes SP1, SP2 involved is advantageously unnecessary. Instead, the association rule in the association unit ASU is changed by access by a configuration process, for example, in a simple engineering system, the access also being possible during the operation of the process control unit 100.

According to one variant, there is provision for the association module ASU to have an interface to a configuration process taking place outside the process control unit. Referring to FIG. 1, for example, a programming-related interface is formed by virtue of the association module ASU using one of the input/output processes IO1, IO2 to access the interface 130 for packet-oriented communication. Alternatively, the association module ASU has a separate external interface (not depicted). The interface is used to execute, for example, a web server application that permits access to the association rule. Both embodiments of the association module ASU form an interface to a configuration process (not depicted) taking place outside the process control unit 100.

This advantageous measure provides that a configuration process may access the association module ASU for the purpose of changing the association rule without the program code on which the association module 100 is based all needing to be changed or even recompiled.

The text below describes a further advantageous variant that likewise uses the above-described interface of the association module ASU to a process taking place outside the process control unit. For test purposes, it may be useful to specifically examine or test the behavior of control programs or else the behavior of individual physical devices in their operative relationship within the process control unit 100.

Figure 4:
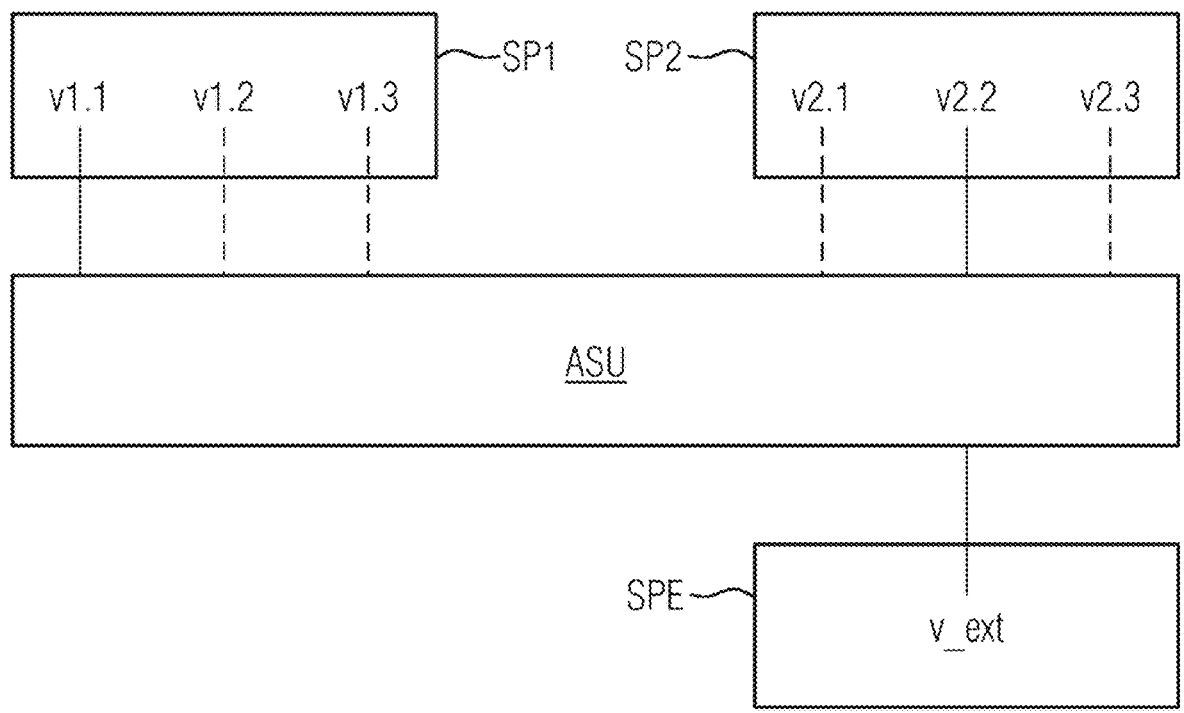
FIG. 4 depicts a block diagram of a logic combination for the interchange of at least one process variable between internal and external control processes according to an exemplary embodiment.

In an illustrative case, it will now be assumed with reference to FIG. 4 that the behavior of the process variable having the process variable identification v1.1 applicable within the first control process SP1 is intended to be checked. To this end, the aforementioned interface is used to execute an external process SPE taking place on an external tester (not depicted) the process having access to the association module ASU and hence to the association rule thereof via the interface.

The external process SPE first uses entry in the association rule of the association unit ASU to prompt an association with the process variable having the process variable identification v_ext. The existing association of the process variable having the process variable identification v1.1 applicable in the first control process SP1 is then no longer—or else: no longer exclusively—logically combined with the process variable having the process variable identification v2.2 of the second control process SP2, but rather is logically combined with the process variable having the process variable identification v_ext. A logic combination for the process variable identification v1.1 and the process variable identification v_ext is thus created dynamically, e.g., at the runtime of the process control unit 100. The previously applicable logic combination for the process variable identification v1.1 and the process variable identification v2.2 either continues (as symbolized in the drawing by a solid line) to exist in addition or is separated by deleting the logic entry between the process variable identification v1.1 and the process variable identification v2.2 in the association table.

The first-mentioned provision of an additional logic combination is suitable in particular for diagnosis or monitoring purposes, wherein the interchange of the process variable having the process variable identification v1.1 applicable in the first control process SP1 and the process variable identification v2.2 applicable in the second control process SP2 is supposed to be unaffected for the purpose of monitoring or diagnosis. The second-mentioned provision of an alternative logic combination is suitable in particular for simulation purposes, wherein the interchange of the process variable having the process variable identification v1.1 applicable in the first control process SP1 is supposed to be replaced for simulation or test purposes by an interchange with the process variable identification v_ext applicable in the external process SPE. In this instance, the external process SPE delivers simulated process variables, to be more precise process variables that have process variable values produced for the purpose of a simulation. A mode using simulated values may be effected in a similar manner to the cited test mode, e.g., a mode is possible in which real measured quantities with simulated values are temporarily used together, without interrupting the whole system.

Figure 5:
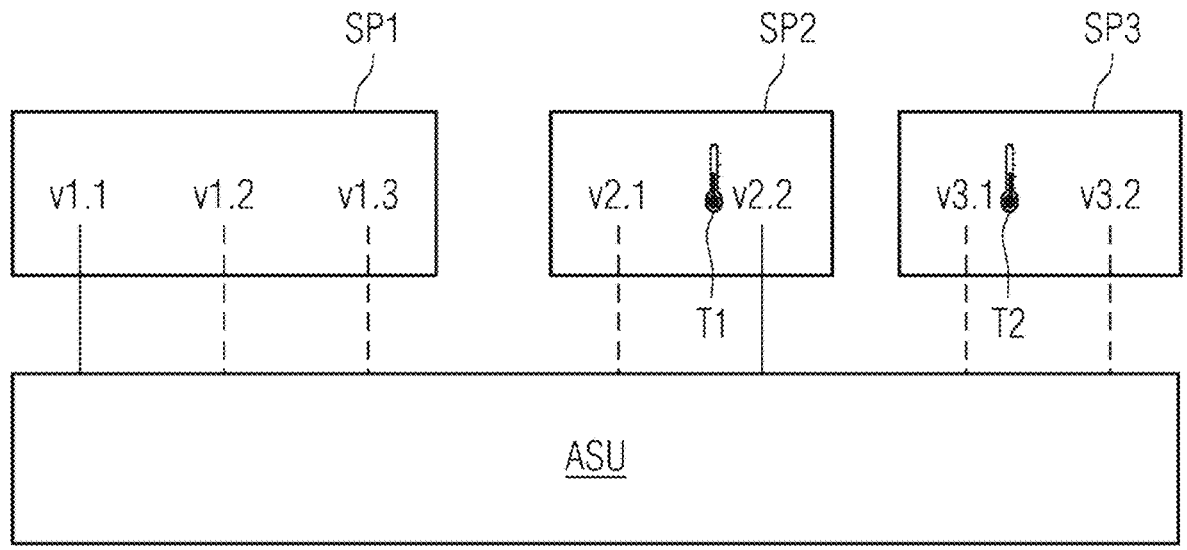
FIG. 5 depicts a block diagram of a logic combination for the interchange of at least one process variable between multiple control processes according to an exemplary embodiment.

The text below describes a further advantageous variant allowing failsafe and/or high-availability operation of the process control unit 100. In an illustrative case, it will now be assumed with reference to FIG. 5 that a first temperature sensor T1 delivers a process variable that has the associated process variable identification v2.2 within a control process SP2 controlling the first temperature sensor T1. A second temperature sensor T2 delivers a process variable that has an associated process variable identification v3.1 within a control process SP3 controlling the second temperature sensor T2.

In this case, the two temperature sensors T1, T2 are arranged adjacently but physically independently of one another at the same measurement location, as a result of which both temperature sensors T1, T2 may measure an identical temperature value. This temperature value is needed by the first control process SP1 at recurring intervals.

In order to read the temperature value, the first control process SP1 is configured such that the process variable containing the temperature value as process variable value, which process variable has the associated process variable identification v1.1 in the control process SP1, is read via the association module ASU. The process variable identification v2.2 of the process variable, which the control process SP2 controlling the first temperature sensor T1 uses to transfer the temperature value as a process variable containing the process variable value to the association module ASU, is read in the association module ASU. The process variable is transferred to the association rule in the association module ASU. According to this association rule, the process variable identification v2.2 read in the association module is replaced by the process variable identification v1.1 stipulated by the association rule. The association module ASU transfers the process variable with the now changed process variable identification v1.1 to the first control process SP1. The process variable value may remain unchanged. The association rule is thus configured for a logic combination of the process variable identification v2.2 and the process variable identification v1.1.

If the first temperature sensor T1 now fails, the first control process SP1 or another control process of the process control unit 100 may prompt a dynamic changeover with regard to the temperature sensor T2, which is equivalent with regard to the measured temperature measured value. This change is made by virtue of a changed entry in the association rule, in which a logic combination for the process variable identification v3.1 and the process variable identification v1.1 is now configured. In the course thereof, the first control process SP1 now receives the temperature measured value from the second temperature sensor T2.

In a development of the variant described above, the association module ASU (which itself is embodied as a control process) is configured such that the process variable value (e.g., the temperature measured value) of the process variable is monitored by the association module ASU itself. If a defined tolerance range with regard to a monitored process variable value is exceeded, the association module ASU may trigger an error or alarm condition, which possibly entails further actions that put the process control unit 100 into a safe state, for example.

In a development of the variant described above, a logic combination between more than two process variable identifications is also advantageous for some applications. One such application relates, for example, to an implementation of safety-relevant systems in which multiple control processes operate simultaneously and redundantly with a value of another control process delivered by process variable.

In combination with the above-described variant of a dynamic variable changeover, it is thus also possible to realize failsafe and high-availability process control units that allow changeover not only, in the course of operation, between process variables that are independent of the rest of the system, (e.g., sensor values), but also between components, (e.g., control processes), that have dependencies on other process variables of the system.

In a simple variant, the association module ASU does not necessarily have to operate in cycle-oriented fashion. In other words, this kind of association module ASU of simple design behaves agnostically toward temporal demands of the process variables to be transmitted. In this simple variant of the association module ASU, a changed process variable is then available without particular time constraints as soon as the process variable identification thereof and/or the process variable value thereof has undergone a change.

In an alternative variant of the association module ASU, the association module actively contributes to synchronization events of the process control unit 100, the transfer of the at least one process variable to at least one control process being effected in cycle-oriented fashion. In a further variant, the association module ASU may additionally be of flexible design in order to attend to scenarios with different demands on a deterministic data interchange, (e.g., also referred to as real time criticality). Together with synchronization between the components or control processes of the process control unit 100, this allows any real time scenarios to be covered. These include time-restricted, cycle-based processing methods as known in conventional PLCs (programmable logic controllers), or alternatively or additionally also freely event-driven processing or completely non-time-based variable processing.

The independence of the process variables logically combined with one another via the association module ASU permits not only a hybrid mode for different process variables but also, as a result of the free multiple logic combination, a hybrid mode (e.g., cyclically or freely) between event-based and unlimited-time processing. This may mean that the same process variable used for strictly cyclic processing may also be used, for example, by a slow, non-time-critical monitoring component.

In summary, the process control unit is configured to execute a plurality of control processes, wherein at least one first control process executed on the process control unit is configured such that for the performance thereof there is no provision for an interchange of process variables with a second control process directly, but rather this interchange is effected via an interposed association module. An association rule is used to ascertain the control process or control processes to which the process variable is to be transferred. A particular advantage of the disclosure may be seen in the increased flexibility in the interchange of process variables, which is now effected in the individual control processes by an association module as a departure from "logical wiring" frozen by programming. Restarts of the process control unit and associated production downtimes advantageously become unnecessary. Additional resources in the process control unit or in an engineering system may be reduced or avoided. The reduced complexity allows the control systems and engineering systems to be developed more easily and therefore also more quickly.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A process control unit configured to execute a plurality of control processes, the process control unit comprising:
a memory configured to load the plurality of control processes; and an association module,
wherein at least one control process of the plurality of control processes is configured to control an industrial process taking place outside the process control unit,
wherein a first control process of the plurality of control processes is configured to interchange process variables with at least one second control process via the association module,
wherein a process variable of the process variables comprises a process variable identification and a process variable value, and
wherein the association module is configured to receive the process variables from the first control process,
wherein the association module is configured to ascertain an association of the process variable of the process variables to which the process variable is to be transferred based on an association rule in the association module,
wherein the association module is configured to change the association of the process variable by replacing the process variable identification of the process variable with a new process variable identification stipulated by the association rule, and
wherein the association module is configured to transfer the process variable of the process variables to the at least one second control process based on the association rule and the new process variable identification.

2. The process control unit of claim 1, wherein the transfer of the process variable to the at least one second control process is effected in cycle-oriented fashion.

3. The process control unit of claim 1, wherein the transfer of the process variable to the at least one second control process is effected within a stipulable period.

4. The process control unit of claim 1, wherein the association module has an interface to a configuration process taking place outside the process control unit.

5. The process control unit of claim 1, wherein at least one control process of the plurality of control processes is configured to perform an iterative sequence of control instructions for controlling the industrial process taking place outside the process control unit.

6. The process control unit of claim 1, wherein the association module is a control process that provides for storage of the process variables in the memory.

7. The process control unit of claim 1, wherein the association module comprises a data bus having an associated bus database.

8. The process control unit of claim 7, wherein the data bus is configured to transfer at least one process variable value according to the process variable identification associated in the bus database.

9. A method for interprocess interchange of process variables within a process control unit in which there is provision for execution of a plurality of control processes, wherein at least one control process of the plurality of control processes is configured to control an industrial process taking place outside the process control unit, and wherein an interchange of process variables of a first control process of the plurality of control processes with at least one second control process of the plurality of control processes via an association module is effected, the method comprising:
receiving, by the association module, at least one process variable transferred from the first control process of the plurality of control processes, wherein the at least one process variable comprises a process variable identification and a process variable value;
ascertaining an association of a process variable of the at least one process variable to which the process variable is to be transferred based on an association rule in the association module;
changing the association of the process variable by replacing the process variable identification of the process variable with a new process variable identification stipulated by the association rule; and
transferring the process variable to at least one second control process of the plurality of control processes based on the association rule and the new process variable identification.

10. The method of claim 9, wherein the transferring of the at least one process variable to the at least one second control process is effected in cycle-oriented fashion.

11. The method of claim 9, wherein the transferring of the at least one process variable to the at least one second control process is effected within a stipulable period.

12. A non-transitory computer program product having a program code, wherein, when the program code is executed as a control process of a plurality of control processes in at least one processor of a process control unit, the program code causes the process control unit to:
receive, by an association module of the process control unit, at least one process variable transferred from a first control process of the plurality of control processes, wherein the at least one process variable comprises a process variable identification and a process variable value;
ascertain an association of a process variable of the at least one process variable to which the process variable is to be transferred based on an association rule in the association module;
change the association of the process variable by replacing the process variable identification of the process variable with a new process variable identification stipulated by the association rule; and
transfer the process variable to at least one second control process of the plurality of control processes based on the association rule and the new process variable identification,
wherein the control process of the plurality of control processes is configured to control an industrial process taking place outside the process control unit.

13. The process control unit of claim 1, wherein the association module is configured to dynamically ascertain and change the association at a runtime of the process control unit based on the association rule.

14. The process control unit of claim 1, wherein the association rule comprises an association table that stores a configuration of logically combined process variables, and
wherein the association table is configured to be dynamically adapted at any time during operation of the process control unit.

15. The process control unit of claim 1, wherein the association rule is configured to be changed without program code on which the association module is based needing to be changed or recompiled.

* * * * *